US012631049B2

(12) United States Patent
Gengler et al.

(10) Patent No.: US 12,631,049 B2
(45) Date of Patent: May 19, 2026

(54) DOOR LOCK AND PROCESS FOR INSTALLING DOOR LOCK

(71) Applicant: JANUS INTERNATIONAL GROUP, LLC, Temple, GA (US)

(72) Inventors: David P. Gengler, Draper, UT (US); John Morgan Hodges, Sarasota, FL (US); Norman Victor Michael Nettie, Kennesaw, GA (US); Jake Gosling, Eagle Mountain, UT (US)

(73) Assignee: Janus International Group, LLC, Temple, GA (US)

( * ) Notice: Subject to any disclaimer, the term of this patent is extended or adjusted under 35 U.S.C. 154(b) by 178 days.

(21) Appl. No.: 18/497,056

(22) Filed: Oct. 30, 2023

(65) Prior Publication Data

US 2024/0141697 A1 May 2, 2024

Related U.S. Application Data

(60) Provisional application No. 63/485,295, filed on Feb. 16, 2023, provisional application No. 63/381,880, filed on Nov. 1, 2022.

(51) Int. Cl.
*E05B 65/00* (2006.01)
*E05B 47/00* (2006.01)

(52) U.S. Cl.
CPC .................... *E05B 65/0021* (2013.01); *E05B 2047/0095* (2013.01)

(58) Field of Classification Search
CPC ...... E05B 55/00; E05B 55/12; E05B 65/0021; E05B 65/0028; E05B 65/02; E05B 65/06; E05B 65/08; E05B 65/0864; E05B 65/087; E05B 47/0012
See application file for complete search history.

(56) References Cited

U.S. PATENT DOCUMENTS

| | | | | | |
|---|---|---|---|---|---|
| 1,368,711 | A * | 2/1921 | Foley | E05C 1/04 | 292/148 |
| 4,095,828 | A * | 6/1978 | East | E05B 67/383 | 292/148 |
| 4,613,175 | A * | 9/1986 | Nelson | E05C 1/04 | 70/56 |

(Continued)

FOREIGN PATENT DOCUMENTS

| | | | | |
|---|---|---|---|---|
| CN | 114165110 A * | 3/2022 | E05B 65/02 |
| EP | 2348490 A1 | 7/2011 | |

OTHER PUBLICATIONS

Search Report and Written Opinion; International Patent Application No. PCT/US2023/036228; Feb. 6, 2024.

(Continued)

*Primary Examiner* — Christine M Mills
*Assistant Examiner* — Faria F Ahmad
(74) *Attorney, Agent, or Firm* — Barnes & Thornburg LLP

(57) ABSTRACT

A door lock can include a latch housing and a movable hasp. The latch housing can be configured to be secured with a door. The movable hasp can engage a catch secured to a door frame. The latch is movable relative to latch housing between an engaged position blocking against movement of the door and a disengaged position allowing movement of the door. Penetration through the door can be aligned with a sensor of the door lock to permit monitoring.

10 Claims, 6 Drawing Sheets

(56) References Cited

U.S. PATENT DOCUMENTS

| | | | | |
|---|---|---|---|---|
| 4,911,486 | A * | 3/1990 | Anderson | E05B 67/38 292/148 |
| 4,932,692 | A * | 6/1990 | Nelson | E05B 67/383 292/148 |
| 5,931,032 | A * | 8/1999 | Gregory | H01F 10/3268 70/56 |
| 6,719,334 | B1 * | 4/2004 | Curtis | E05C 1/04 292/281 |
| 6,893,060 | B2 * | 5/2005 | Ng | E05B 45/083 70/417 |
| 7,032,418 | B2 * | 4/2006 | Martin | E05B 65/08 70/279.1 |
| 7,350,383 | B1 * | 4/2008 | Kuo | E05B 63/20 70/279.1 |
| 8,220,296 | B2 * | 7/2012 | Boonstra | E05C 19/08 70/2 |
| 8,272,241 | B2 * | 9/2012 | Brown | G07C 9/00896 292/357 |
| 8,596,330 | B2 * | 12/2013 | Slusarski | E05B 47/0696 292/341.16 |
| 8,827,332 | B2 * | 9/2014 | Balay | E05B 47/0603 292/341.15 |
| 10,968,660 | B2 * | 4/2021 | Maiga | G07C 9/00309 |
| 11,170,597 | B2 * | 11/2021 | Roper | G07C 9/37 |
| 11,505,967 | B2 * | 11/2022 | Mantena | E05B 55/12 |
| 11,846,120 | B2 * | 12/2023 | Hill | E05B 47/0012 |
| 11,879,271 | B2 * | 1/2024 | Mantena | E05B 65/08 |
| 11,920,378 | B2 * | 3/2024 | Barnett, III | E05B 47/0607 |
| 12,146,345 | B2 * | 11/2024 | Chiti | E05B 65/0021 |
| 12,241,287 | B2 * | 3/2025 | Shelton | E05B 67/383 |
| 12,307,849 | B2 * | 5/2025 | Roper | E05C 1/04 |
| 2003/0164615 | A1 | 9/2003 | Ng | |
| 2005/0235711 | A1 * | 10/2005 | Martin | E05B 65/08 70/100 |
| 2006/0118253 | A1 | 6/2006 | Slusarski et al. | |
| 2007/0046038 | A1 | 3/2007 | Schlack et al. | |
| 2009/0260407 | A1 * | 10/2009 | Henson | E05C 1/04 70/129 |
| 2010/0180511 | A1 * | 7/2010 | Mahdi | E05B 63/0056 70/91 |
| 2014/0183881 | A1 * | 7/2014 | Armari | E05B 47/0012 292/229 |
| 2015/0225983 | A1 * | 8/2015 | Alzingre | E05B 15/0073 292/143 |
| 2016/0083977 | A1 * | 3/2016 | Pickard | E05B 67/06 70/431 |
| 2017/0116802 | A1 | 4/2017 | Handville et al. | |
| 2018/0363331 | A1 | 12/2018 | Lynn et al. | |
| 2019/0088048 | A1 | 3/2019 | Minsley et al. | |
| 2019/0289553 | A1 | 9/2019 | Kincaid et al. | |
| 2020/0190857 | A1 * | 6/2020 | Liu | E05B 9/02 |
| 2020/0242868 | A1 | 7/2020 | Gengler et al. | |
| 2020/0327757 | A1 | 10/2020 | Kelley et al. | |
| 2021/0019972 | A1 | 1/2021 | Roper et al. | |
| 2021/0054657 | A1 | 2/2021 | Luebeck et al. | |
| 2021/0054661 | A1 | 2/2021 | Mantena et al. | |
| 2021/0348421 | A1 * | 11/2021 | Haagendrup | E05B 47/0002 |
| 2022/0042349 | A1 * | 2/2022 | Barnett, III | E05B 47/0038 |
| 2023/0077654 | A1 | 3/2023 | Mantena et al. | |
| 2023/0304319 | A1 | 9/2023 | Kuenzi et al. | |

OTHER PUBLICATIONS

Search Report and Written Opinion; International Patent Application No. PCT/US2023/036236; Feb. 8, 2024.

International Preliminary Report on Patentability in PCT/US2023/036228, mailed May 15, 2025.

* cited by examiner

DOOR LOCK AND PROCESS FOR INSTALLING DOOR LOCK

CROSS-REFERENCE

This application claims priority under 35 U.S.C. § 119(e) to U.S. Provisional Patent Application No. 63/381,880, filed Nov. 1, 2022, and to U.S. Provisional Patent Application No. 63/485,295, filed Feb. 16, 2023, each of which are expressly incorporated by reference herein in their entireties.

TECHNICAL FIELD

The present disclosure generally relates to devices, systems, and methods for secure access, and more specifically to devices, systems, and methods for secure access via storage doors.

Secure access, including via storage doors, can present challenges to deployment and/or maintenance of secure access devices, such as locks. Some storage facilities are separated by individual storage units. Storage units may have one or more locks to control access to the storage unit. Some locks are completely removable from the storage unit. This can pose issues for a tenant and facility owners if the lock is lost, for example. Additionally, installation of suitable locks can be troublesome, for example, for onsite installation.

SUMMARY

In accordance with an aspect of the present disclosure, a method may include forming a corrugated door panel. The corrugated door panel may include a plurality of ridges and a plurality of grooves. The corrugated door panel may alternate between a single groove and single ridge along a height of the corrugated door panel.

In some embodiments, the method may further include providing a door lock including a latch housing, a movable latch coupled to the latch housing for sliding movement between a retracted position and an extended position, and a lock mount system configured to attach the door lock to the corrugated door panel. The lock mount system may include a plurality of fasteners, a retainer plate, and a temporary attachment adhesive fixed to a rear surface of the latch housing.

In some embodiments, the method may further include forming first and second attachment openings through a first ridge included in the plurality of ridges. The first and second attachment openings may be spaced apart from one another in a direction transverse to the height of the corrugated door panel.

In some embodiments, the method may further include forming third and fourth attachment openings through a second ridge included in the plurality of ridges. The third and fourth attachment openings may be spaced apart from the first ridge by a single groove.

In some embodiments, the method may further include removing a release layer from the temporary attachment adhesive. In some embodiments, the method may further include aligning the first, second, third, and fourth attachment openings with corresponding openings formed in the latch housing.

In some embodiments, the method may further include contacting the temporary attachment adhesive with a front surface of the corrugated door panel so that the temporary attachment adhesive retains the door lock to the corrugated door panel. In some embodiments, the method may further include inserting each fastener of the plurality of fasteners through each corresponding opening formed in the latch housing and the corrugated door panel. In some embodiments, the method may further include contacting the retainer plate with a rear surface of the corrugated door panel opposite the front surface such that each of the plurality of fasteners extend through corresponding openings formed in the retainer plate.

In some embodiments, the method may further include a step of forming a first sensor opening in the corrugated door panel between the first and second ridges. The door lock may further include a motion sensor that is arranged to lie at least partially within the latch housing. The motion sensor may be aligned with the first sensor opening when the door lock is fully installed on the corrugated door panel. In some embodiments, the method may further include the retainer plate being formed to include a second sensor opening aligned with the first sensor opening and the motion sensor when the door lock is installed on the corrugated door panel.

In some embodiments, the door lock may further include encoded visual indicia. The method may further comprise scanning the encoded visual indicia with an optical camera of a mobile device. In some embodiments, the encoded visual indicia may be configured to generate instructions on the mobile device. The instructions may include identifying information for the door lock. The method may further include pairing the door lock with a numbered storage unit to which the corrugated door panel is attached.

According to another aspect of the present disclosure, a method includes providing a corrugated door panel including at least one groove arranged between at least two ridges along a height of the corrugated door panel. In some embodiments, the method may further include providing a door lock including a latch housing, a movable latch coupled with the latch housing for movement between a retracted position and an extended position, and a lock mount system configured to couple the door lock to the corrugated door panel, the lock mount system including a retainer plate.

In some embodiments, the method may further include forming at least one attachment opening through the corrugated door panel. In some embodiments, the method may further include arranging the door lock such that the at least one attachment opening of the corrugated door panel aligns with a complementary opening formed in the latch housing.

In some embodiments, the method may further include adhering the door lock with a front surface of the corrugated door panel with adhesive composition so that the door lock remains in position with the corrugated door panel. In some embodiments, the method may further include fastening the door lock with the corrugated door panel via a fastener through each of the at least one attachment opening, the complementary opening of the corrugated door panel, and complementary openings of the retainer plate, with the retainer plate arranged on a side of the corrugated door panel opposite the latch housing.

According to another aspect of the present disclosure a secure access system includes a door lock assembly including a latch housing, a movable latch coupled with the latch housing for movement between a retracted position to permit access and an extended position to block against access, and a sensor arranged at least partially within the latch housing. In some embodiments, the system may further include at least one corrugated door panel having the door lock assembly coupled therewith on one side, the at least one corrugated door panel comprising a sensor port penetrating therethrough, the sensor port arranged complementary with the latch housing to permit field of view of the sensor beyond the corrugated door panel.

In some embodiments, the door lock assembly may further include a retainer plate configured for arrangement on an opposite side of the corrugated door panel, the retainer plate defining a sensor port arranged complementary with the sensor port of the sensor port of the at least one corrugated door panel to permit field of view of the sensor.

In some embodiments, the door lock assembly may further include a temporary attachment adhesive coupled to a rearwardly-facing surface of the latch housing. The temporary attachment adhesive may be configured to temporarily attach the door lock assembly to the corrugated door panel prior to permanent attachment with a fastener.

In some embodiments, the door lock assembly further includes a second sensor arranged on a forward-facing side of the door panel. The second sensor may include a motion sensor, and the motion sensor is configured to monitor motion within a field of view in front of the door panel. In some embodiments, the door lock assembly further includes a touch sensor and communication circuitry, and wherein the communication circuitry is configured to change from an inactive state to an active state in response to a touch sensed by touch sensor.

In some embodiments, the secure access system may further include a control system in a remote location separated from the door lock assembly. Each sensor may be configured to output signals to the control system in response to corresponding motion in front of the door panel or behind the door panel when the communication circuitry is in the inactive state and the active state.

In some embodiments, the door lock assembly further includes communication circuitry configured to output signals when motion is sensed in either or both of in front of the door panel and behind the door panel. The control system may be configured to receive the signals from the communications circuitry, and the communication circuitry may be configured to change from an inactive state to an active state in response to motion sensed in either or both of in front of the door panel and behind the door panel.

In another aspect of the present disclosure, a door lock assembly may include a latch housing for securing with a door and a movable hasp coupled with the latch housing for movement between a retracted position to permit access and an extended position to block against access. In some embodiments, the door lock assembly may further include a sensor arranged at least partially within the latch housing and configured for sensing with a field of view directed rearward relative to the latch housing.

In some embodiments, the sensor includes configuration for thermal sensing. In some embodiments, the sensor includes configuration for motion sensing. In some embodiments, the latch housing is arranged with at least one opening via which the sensor is arranged to direct rearward field of view for monitoring interior of a secure space.

In another aspect of the present disclosure, a facility monitoring system may be configured to monitor for events occurring within a facility including a plurality of individual units each having a door panel configured to open and close to allow access to each unit. The facility monitoring system may include a control system including a processor, memory, and communication circuitry, and a plurality of door locks. Each door lock may corresponding to the door panel of each respective unit and may be configured to change between a locked state and an unlocked state. Each door lock may include a forward-facing sensor configured to monitor for motion in front of the door panel and a rearward-farcing sensor configured to monitor for motion behind the door panel within each respective unit.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1A:
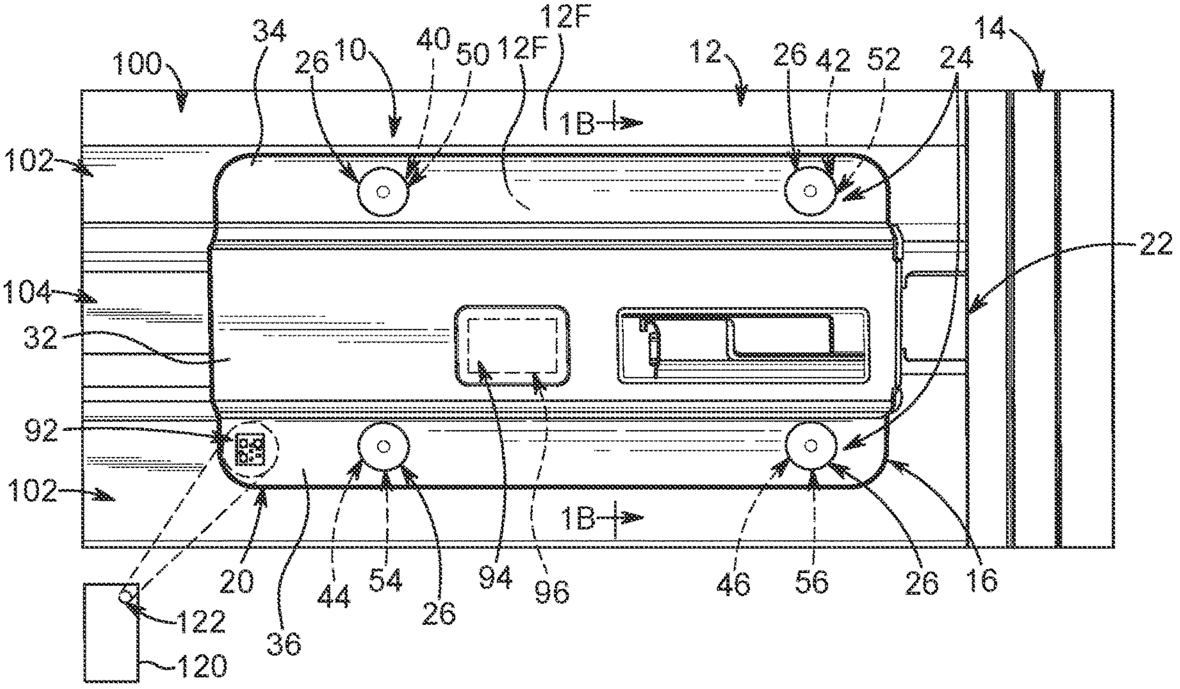
FIG. 1A is a perspective view of a front side of a door including a door panel and a door lock that is mounted to the door panel to engage selectively with a catch that is mounted to a door frame adjacent the door to block against movement of the door relative to the door frame.
Figure 3:
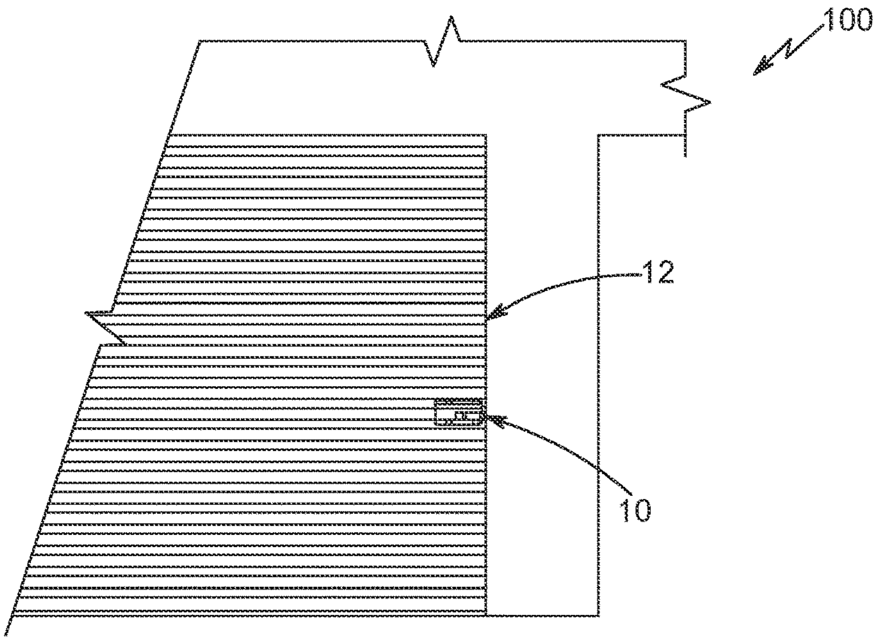
FIG. 3 is a front elevation view of a corrugated roll-up door including a door lock in accordance with aspects of the present disclosure.
Figure 4:
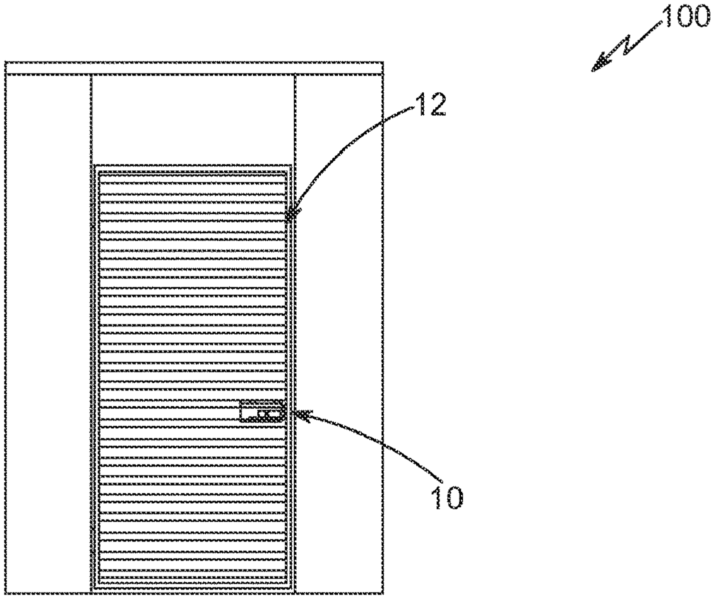
FIG. 4 is a front elevation view of a corrugated swing door including a door lock in accordance with aspects of the present disclosure.

Referring to FIG. 1A, a door lock 10 is mounted to a door panel 12 to provide a lockable door 100. The door lock 10 is configured to block against movement of the door panel 12 relative to a door frame 14 when the door panel 12 is in a closed position to block passage through the door frame 14. In the illustrative embodiment, the door 100 is a corrugated roll-up door, as shown in FIG. 3, or a corrugated swing door, as shown in FIG. 4, but in some embodiments, may have any suitable arrangement or form. The door lock 10 is illustratively formed to match contours of the door panel 12 to become a unitary piece with the door panel 12 when the door 100 is assembled at a facility, for example.

Figure 2:
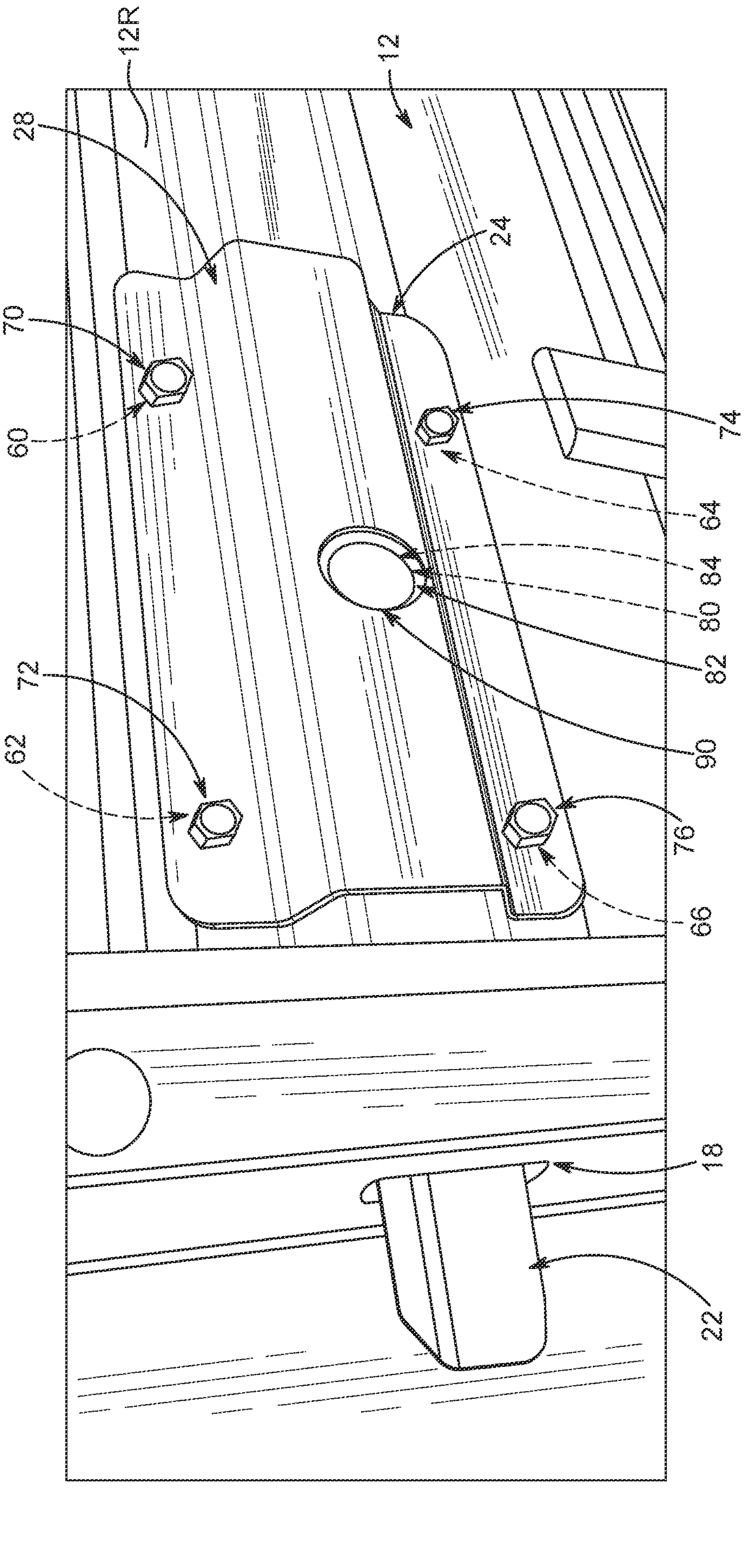
FIG. 2 is a perspective view of a rear side of the door showing features of the lock mount system in detail and showing that the door lock may further include a motion sensor to monitor conditions within a secure area within which the door controls access.

The door lock 10 includes a latch 16 coupled with the door panel 12 and configured to engage with a catch 18 coupled with the door frame 14 as shown in FIGS. 1A and 2. The latch 16 is arranged to lie on an exterior side 12F of the door panel 12 and is movable between a locked configuration for engagement with the frame 14, as shown in FIG. 1A, and an unlocked configuration disengaged from the frame 14. In the locked configuration, the latch 16 engages or overlaps with the catch 18 and is configured to block against movement of the door panel 12 relative to the door frame 14. In the unlocked configuration, the latch 16 is disengaged (illustratively by translation leftward in the orientation as shown in FIG. 1A) and spaced apart from the catch 18, such that the door panel 12 is free to move relative to the door frame 14 to an opened position to allow passage through the door frame 14.

The door lock 10 includes a latch housing 20 which is illustratively fixed with the door for movement therewith, and a hasp 22 formed as a portion of latch 16 that is movably coupled with the latch housing 20. The door lock 10 illustratively includes a lock mount system 24 as show in FIGS. 1A and 2. The latch housing 20 is illustratively shaped to conform with the contours of the door panel 12. The movable hasp 22 is arranged to lie at least partially within an interior space defined by portions of the latch housing 20. The movable hasp 22 is movable (slideable) relative to the latch housing 20 between an engaged position contacting or overlapping the catch 18 to establish the locked configuration and a disengaged position spaced apart from the catch 18 to establish the unlocked configuration. In the engaged position, the movable hasp 22 engages within portions of the catch 18 and/or the door frame 14 and blocks the door panel 12 from opening. In the disengaged position, the door panel 12 is free to move relative to the door frame 14 to allow passage through the door frame 14. The lock mount system 24 is configured to secure the latch 16 to the door panel 12.

Figure 1B:
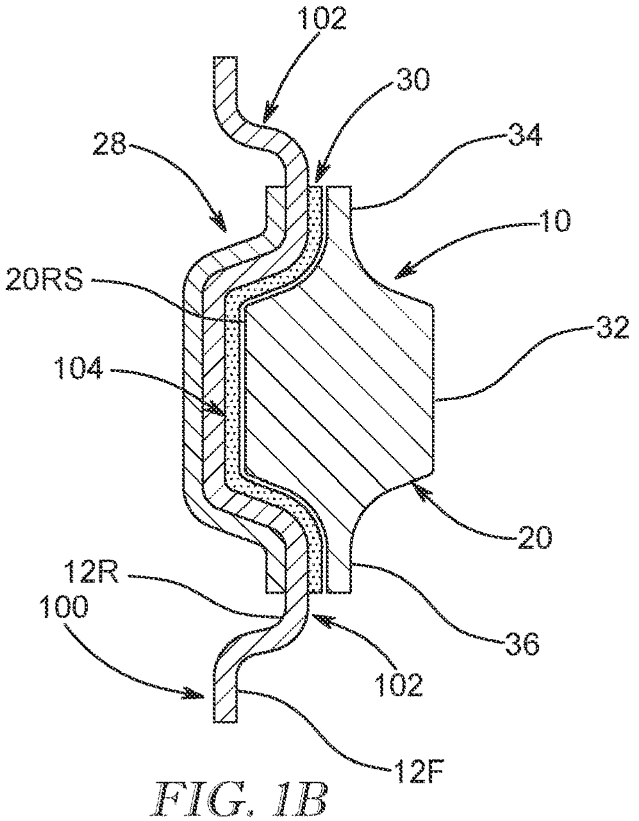
FIG. 1B is a cross section of a portion of the door showing that the door lock includes a lock mount system that facilitates installation of the door lock on the door panel.

The lock mount system 24 can be used by manufacturers of the door 100 to install the latch 16 on the door panel 12, prior to door installation, for example, at a manufacturing facility. The lock mount system 24 illustratively includes fasteners 26, a retainer plate 28, and a temporary attachment adhesive 30 as shown in FIGS. 1A-2. The fasteners 26 are illustratively configured to pass through the latch housing 20 and the door panel 12 and engage with the retainer plate 28 to retain the latch 18 to the door panel 12. The latch housing 20 is arranged to lie on a front surface 12F of the door panel 12 while the retainer plate 28 is arranged to lie on a rear surface 12R of the door panel 12 to locate the door panel 12 between the latch housing 20 and the retainer plate 28 when the door lock 10 is fully installed on the door panel 12. The temporary attachment adhesive 30 is fixed to a rearwardly-facing surface 20RS of the latch housing 20 to lie between portions of the door panel 12 and the door lock 10 when the door lock 10 is installed on the door panel 12 as shown in FIG. 1B. In some embodiments, a layer of adhesive can be placed on the retainer plate 28 to temporarily attach the retainer plate to the rear surface 12R of the door panel 12. In yet another embodiment, the adhesive 30 is attached first to the door panel 12 and then the lock housing 20 and/or retainer plate 28 are placed on the adhesive 30.

In the illustrative embodiment, the door panel 12 includes a plurality of alternating ridges 102 and grooves 104 that form a corrugated pattern or profile as shown in FIG. 1A. The latch housing 20 is configured to match portions of the corrugated profile of the door panel 12 and includes a latch body 32 and a pair of flanges 34, 36 extending outwardly from the latch body 32 and away from one another. The latch body 32 is illustratively sized with a height and thickness to fit at least partially within one of the grooves 104 of the door panel 12. The flanges 34, 36 each extend outwardly to at least partially overlie neighboring ridges 102 of the door panel 12. The plurality of fasteners 26 are coupled to each of the flanges 34, 36 and extend into the respective neighboring ridges 102 of the door panel 12 to the retainer plate 28 to fix the door lock 10 to the door panel 12. In some embodiments, the plurality of fasteners 26 pull the latch housing 20 and the retainer plate 28 together such that a compressive load is applied on the door panel 12 by the latch housing 20 and the retainer plate 28.

Figure 5:
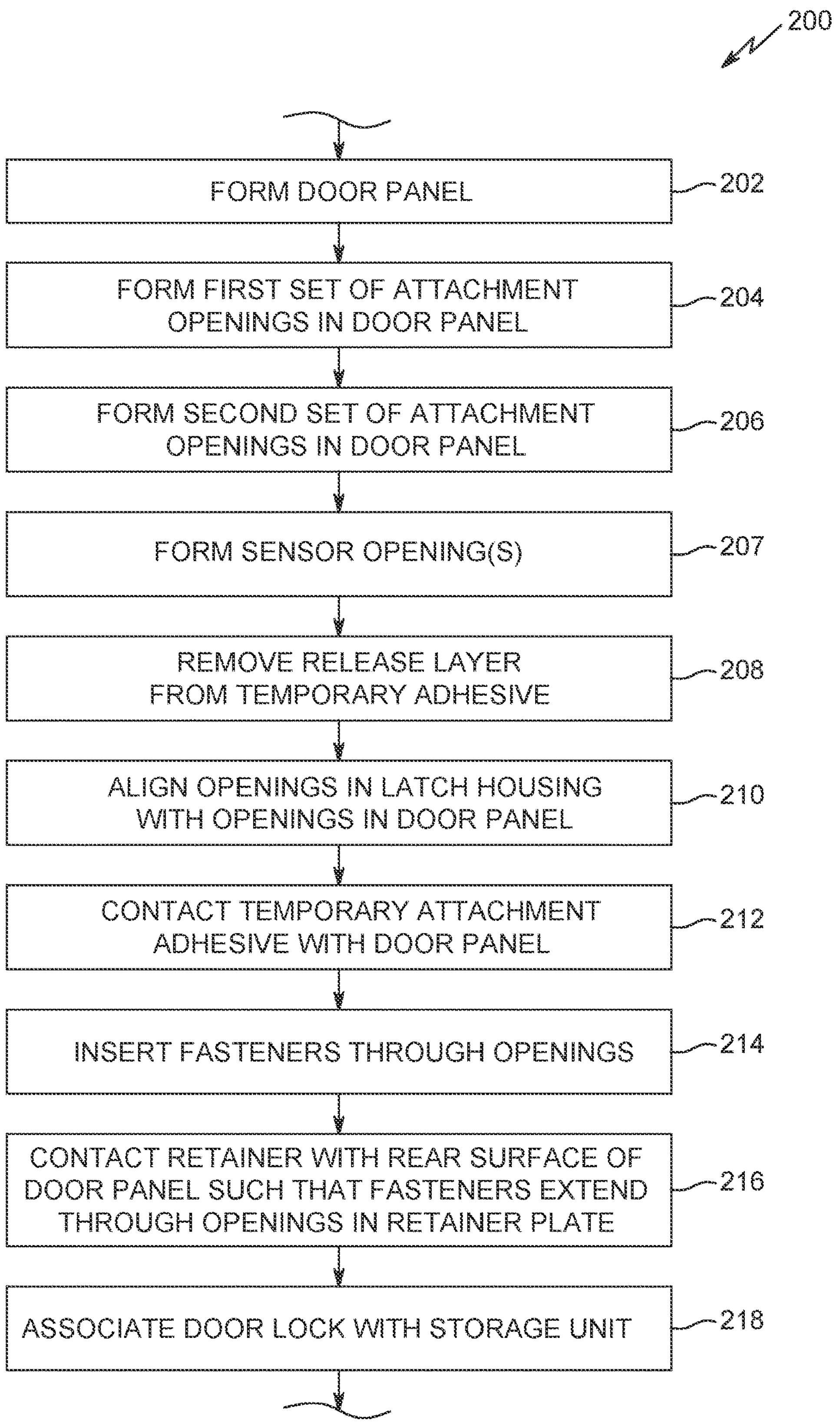
FIG. 5 is a flow chart of an illustrative process by which a door lock installed on the door panel in accordance with aspects of the present disclosure.

The temporary attachment adhesive 30 is configured to retain at least one of the latch housing 20 and the retainer plate 28 to the door panel 12 while the door lock 10 is being installed to facilitate proper installation of the door lock 10 on the door panel 12 during an installation process 200 as shown in FIG. 5. The process 200 can be performed at a manufacturing facility that assembles the door 100. In some embodiments, one or more steps of the process 200 are performed outside of the manufacturing facility.

The process 200 illustratively includes a step 202 of forming the door panel 12. The door panel 12 is formed to include the plurality of alternating ridges 102 and grooves 104 during step 202. In one embodiment, the plurality of ridges 102 and grooves 104 are formed by a pressing machine. The plurality of ridges 102 and grooves 104 may be formed such that the door panel 12 has a substantially constant cross-sectional thickness as shown in FIG. 1B.

The process 200 further includes a step 204 of forming first and second attachment openings 40, 42 through a first ridge included in the plurality of ridges 102. The first and second attachment openings 40, 42 are spaced apart from one another in a direction transverse to the height of the corrugated door panel 12. The process 200 further includes a step 206 of forming third and fourth attachment openings 44, 46 through a second ridge included in the plurality of ridges 102 and spaced apart from the first ridge by a single groove 104. It should be appreciated that although only four attachment openings are formed in the door panel 12, any number of openings may be formed in the door panel 12 and used to retain the door lock 10 to the door panel 12.

The process 200 further includes a step 208 of removing a release layer covering the temporary attachment adhesive 30. Step 208 is optional and the door lock 10 may not include a release layer covering the temporary attachment adhesive 30. Further, the process 200 illustratively includes a step of applying the temporary attachment adhesive 30 to at least one of the rearwardly-facing surface 20RS of the latch housing 20 and the front surface 12F of the door panel 12.

The process 200 further includes a step 210 of aligning the first, second, third, and fourth attachment openings 40, 42, 44, 46 formed in the door panel 12 with corresponding openings 50, 52, 54, 56 formed in the latch housing 20. The openings 50, 52, 54, 56 may be formed in the side flanges 34, 36 of the latch housing 20 and are substantially concentric with each corresponding attachment opening 40, 42, 44, 46 when they are aligned. In the illustrative embodiment, any number of openings may be formed in the side flanges 34, 36 to correspond with the attachment openings 40, 42, 44, 46 formed in the door panel 12.

The process 200 further includes a step 212 of contacting the temporary attachment adhesive 30 with the front surface 12F of the corrugated door panel 12 so that the temporary attachment adhesive 30 retains the door lock 10 to the corrugated door panel 12 at least temporarily. The temporary attachment adhesive 30 may be applied between the entire the rearwardly-facing surface 20RS of the latch housing 20 interfacing with the front surface 12F of the door panel 12 or along only a portion of the rearwardly-facing surface 20RS, such as the side flanges 34, 36.

The process 200 further includes a step 214 of inserting each fastener 26 included in the plurality of fasteners 26 through each opening 40, 42, 44, 46 formed in the latch housing 20 and each corresponding opening 50, 52, 54, 56 formed in the corrugated door panel 12. In the illustrative embodiment, each of the fasteners 26 is a carriage or lag bolt having a concaved-shaped head that most removal tools, such as pliers or a wrench, cannot grip. In this way, removal of the fasteners 26 from a side of the door panel 12 facing the front surface 12F is more difficult which can assist to block against unauthorized access through the door 100.

The process 200 further includes a step 216 of contacting the retainer plate 28 with a rear surface 12R of the corrugated door panel 12 opposite the front surface 12F. The retainer plate 28 is also formed to include a plurality of openings 60, 62, 64, 66 that correspond with the attachment openings 40, 42, 44, 46 formed in the door panel 12 and the openings 50, 52, 54, 56 formed in the latch housing 20. Each of the plurality of fasteners 26 extend through the corresponding openings 60, 62, 64, 66 formed in the retainer plate 28. A nut 70, 72, 74, 76 is then threaded onto an end of each fastener 26 protruding through the openings 60, 62, 64, 66 and tightened to complete installation of the door lock 10 on the door panel 12.

In some embodiments, the process 200 may further include a step 207 of forming a first sensor opening 80 in the corrugated door panel 12. The first sensor opening 80 is illustratively arranged to lie between two neighboring ridges 102 or grooves 104.

The door lock 10 further includes a first or rearward-facing sensor 90 that is arranged to lie at least partially within the latch housing 20 and that is aligned with the first sensor opening 80 when the door lock 10 is fully installed on the corrugated door panel 12. The sensor 90 faces away from the rear surface 12R of the door panel 12 and into the secure area within which the door 100 controls access to monitor the secured area. The door lock 10 may further include a second or forward-facing sensor 96 that faces in an opposite direction to the first sensor 90. The second sensor 96 is configured to monitor and sense motions or physical touch on the sensor in an exterior environment outside of the secure area. In the illustrative embodiment, both forward and rearward facing sensors are configured for motion sensing, including visual or optical sensors, audio sensors, and/or other suitable sensors, and have field of view (or range of sensing) in front of and behind the door 100, respectively; although in some embodiments, the rearward-facing sensor 90 may be configured to include thermal sensing capability, embodied as thermal imaging, and the forward-facing sensor 96 may be configured for motion sensing. For example, either or both of the sensors 90, 96 may be formed as an optical and/or infrared sensor that monitors for movement and/or heat, and/or in some embodiments, may include any manner of sensor for monitoring areas around the door 100 (i.e., in front of or behind the door 100). In some embodiments, the data captured by either or both of the sensors 90, 96 includes only motion/proximity data and/or thermal signature data, and does not include any true visual imaging data so that items within the unit and/or the visual identity of persons passing in front of the door lock are indiscernible by the sensors 90, 96 to preserve tenant privacy, for example, such that only motion or presence is sensed without detail picture images or video. In some embodiments, one or more of sensors 90, 96 may include other light, sound, chemical, and/or thermal capabilities, for example, but without limitations, light-based (e.g., lidar), microphone, aerosol detection, thermal imaging, and/or other suitable sensing capabilities. Electronics included in the door lock 10 may be configured to communicate an alert to a remote location, such as a mobile device via an intermediary communications system, if the latch 16 is locked and one or more of the sensors 90, 96 sense activity in the exterior environment or within the secure area, respectively.

In the illustrative embodiment, the retainer plate 28 is formed to include another sensor opening 82 aligned with the first sensor opening 80 and the sensor 90 when the door lock 10 is installed on the corrugated door panel 12. In some embodiments, the sensor opening 82 is omitted and the motion sensor 90 can be misaligned with the retainer plate 28 to permit field of view of the sensor within the secure area. It can be appreciated that still another sensor opening 84 may be formed in the rearwardly-facing surface 20RS of the latch housing 20 (when present) to allow the sensor 90 to protrude or have field of view (e.g., line-of-sight) through the other sensor openings 80, 82 and into the secure area.

The process 200 may further include a step 218 of associating the door lock 10 with a storage unit. The door lock 10 may further include encoded visual indicia 92 as shown in FIG. 1A. The step 216 of associating the door lock 10 with a storage unit includes scanning the encoded visual indicia with an optical camera 122 of a mobile device 120. The encoded visual indicia 92 is configured to generate instructions on the mobile device 120 upon being scanned by the optical camera 122. The instructions include identifying information for the door lock 10 so that the door lock 10 can be paired with a particular storage unit (i.e. by numbers, letters, etc.) to which the corrugated door panel 12 is attached. In illustrative embodiments, the encoded visual indicia 92 includes a barcode, a quick response (QR) code, or any other suitable pattern of markings that is capable of generating instructions when scanned by the optical camera 122 of mobile device 120. The instructions may be obtained by retrieval through communications with remote computing systems, including for example, web-based services. The encoded visual indicia 92 may be formed directly onto a portion of the latch 16, such as the latch housing 20, or may be displayed on a screen or user interface 94 included in the electronics of the door lock 10.

In the illustrative embodiment, the door lock 10 is an electronic door lock 10 and may be controlled using a mobile device 120 that communicates with the door lock 10 over a network. The mobile device 120 can be used by a user to input commands to lock and/or unlock the door lock 10, for example. The mobile device 120 may be embodied as any physical computing device accessible by a user (e.g., a tenant user, an operator or employee of the storage facility system, a system administrator, etc.) having wireless communication functionality, such as a smart phone, smart tablet, laptop device, etc. The mobile device 120 may be owned by a tenant user, a device located on-site at the underlying self-storage facility, a device located remotely from the self-storage facility (e.g., at a management console associated with the self-storage facility), and so on. Illustratively, the mobile device 120 also includes an app. In an embodiment, the app allows a tenant user to communicate with a cloud service also coupled to the network, authenticate credentials associated with the user, identify one or more door locks registered to the user, and lock or unlock the door locks through a graphical user interface presented on a display of the mobile device 120. The door lock 10 may include any suitable communication circuitry to communicate with the mobile device 120 such as Bluetooth, Wifi, Zigbee, Ultra wideband (UWB), or any other suitable wireless means.

It should be appreciated that the door lock 10 includes suitable electronics for controlling operation of the door lock 10 and communicating with mobile devices, such as one or more processors, memory, and circuitry. Within the present disclosure, examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry includes components for facilitating processor operations, for example, suitable components may include transmitters, receivers, modulators, demodulators, filters, modems, analog/digital (AD or DA) converters, diodes, switches, operational amplifiers, and/or integrated circuits.

Figure 6:
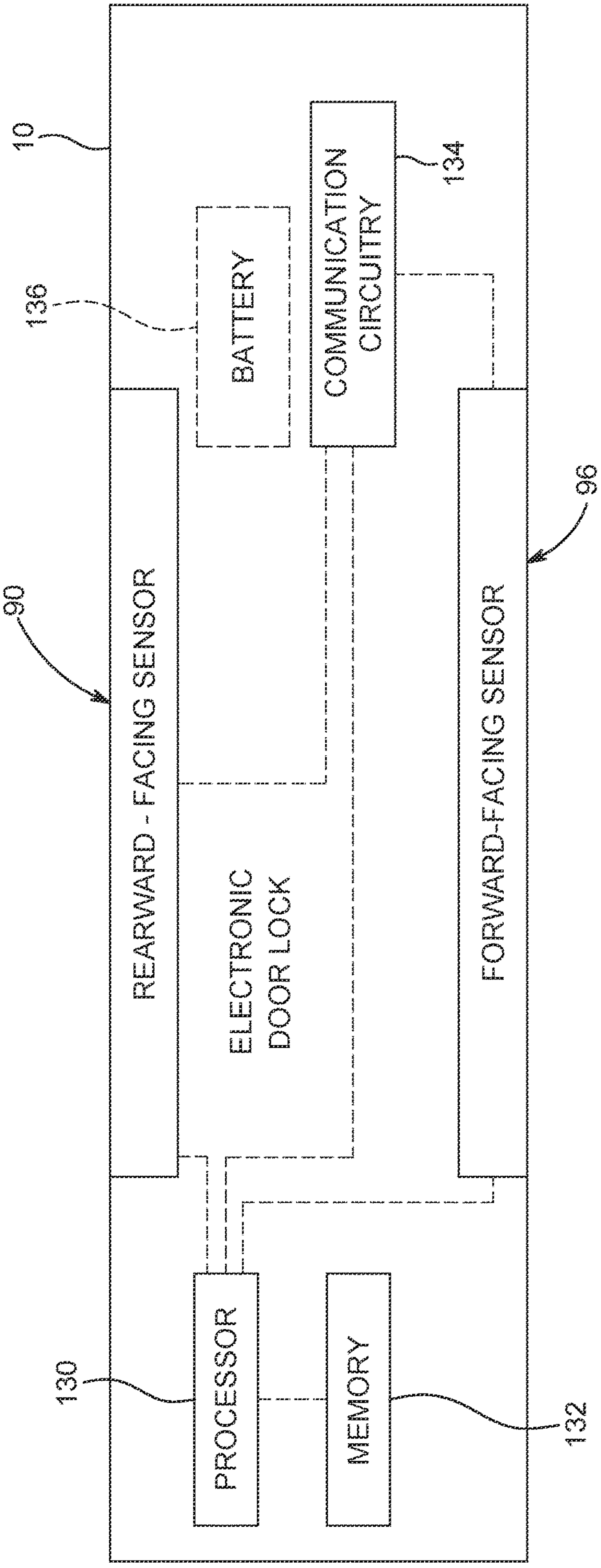
FIG. 6 is a diagrammatic view of the door lock in accordance with aspects of the present disclosure.

Referring now to FIG. 6, the door lock 10 is shown diagrammatically as including various suitable electronics connected to the sensors 90, 96 to control operation and notification functions of the door lock 10 using the sensors 90, 96. The door lock 10 further includes a processor 130, a memory storage device 132, and communications circuitry 134. The processor 130 is arranged in communication with sensor 90, sensor 96, with the memory storage device 132, and the communications circuitry 134 to send and receive signals or commands in response to one or more inputs from the one or both sensors 90, 96 or from a user via the communications circuitry 134. The memory storage device 132 stores instructions that, when executed by the processor 130, causes one or actions to be performed by one or more of the sensor(s) 90, 96 or other electronic components or systems included in the door lock 10 such as, interface 94, a solenoid or other suitable component used to lock the hasp 22, etc. The memory storage device 132 may also store instructions that, when executed by the processor 130, causes one or more alert signals to be output to the communications circuitry 134, which may then be relayed to a remote device or control system 320 to provide an alert or notification to users as will be described in greater detail in the Exemplary Situations below. The communications circuitry 134 can include any suitable component for facilitating/communicating processor operations. For example, suitable components may include one or more transmitters, receivers, transceivers, modulators, demodulators, filters, modems, analog/digital (AD or DA) converters, diodes, switches, operational amplifiers, and/or integrated circuits. Such components can use any suitable communication method to communicate signals between each component, such as, for example, Bluetooth, Wifi, Zigbee, Ultra wideband (UWB), or any other suitable wireless means. In some embodiments, the sensors 90, 96 can be connected directly to the communications circuitry 134 and the processor 130 and memory storage device 132 can be omitted such that the sensors 90, 96 are controlled by and communicate directly with the remote device or control system 320.

In some embodiments, the second sensor 96 includes a touch sensor that a user physically touches to begin performing actions with the door lock 10. For example, the second sensor 96 can include a capacitive touch sensor that changes a state of the door lock 10 when touched by the user. The door lock 10 may be configured to change from a low-power, inactive state to a higher-powered, active state in response to being touched by the user. In the inactive state, the communication circuitry 134 may be in a low-power, standby mode and the second sensor 96 may only monitor for motion in front of the door 100, and threshold motion may trigger state change to the active state. In some embodiments, in the inactive state, the communication circuitry 134 may be in a low-power, standby mode and the first sensor 90 may only monitor for motion and or thermal sensitivity inside of the door 100, and threshold motion/thermal may trigger state change to the active state. In some embodiments, both sensors 90,96 may remain active during low-power states for trigger state change to the active state upon threshold activity levels. In the active state, the communications circuitry 134 may be in a higher-power, data-transmission mode to send signals to the control system 320. In some embodiments, the door lock 10 may change from the inactive state to the active state in response to the second sensor 96 sensing motion in front of the door 100 and/or the first sensor 90 sensing motion behind the door 100 in the secured area. The second sensor 96 may be included in or arranged next to the interface 94.

In the illustrative embodiment, the door lock 10, and each electrical component included therein, is battery powered and includes one or more internal batteries 136 to provide electrical power to all of the electrical components included in the door lock 10. In other embodiments, the door lock 10 can be connected directly to an external power source, such as grid power, a generator, solar, etc., in such implementations the battery 136 may or may not be omitted.

Figure 7:
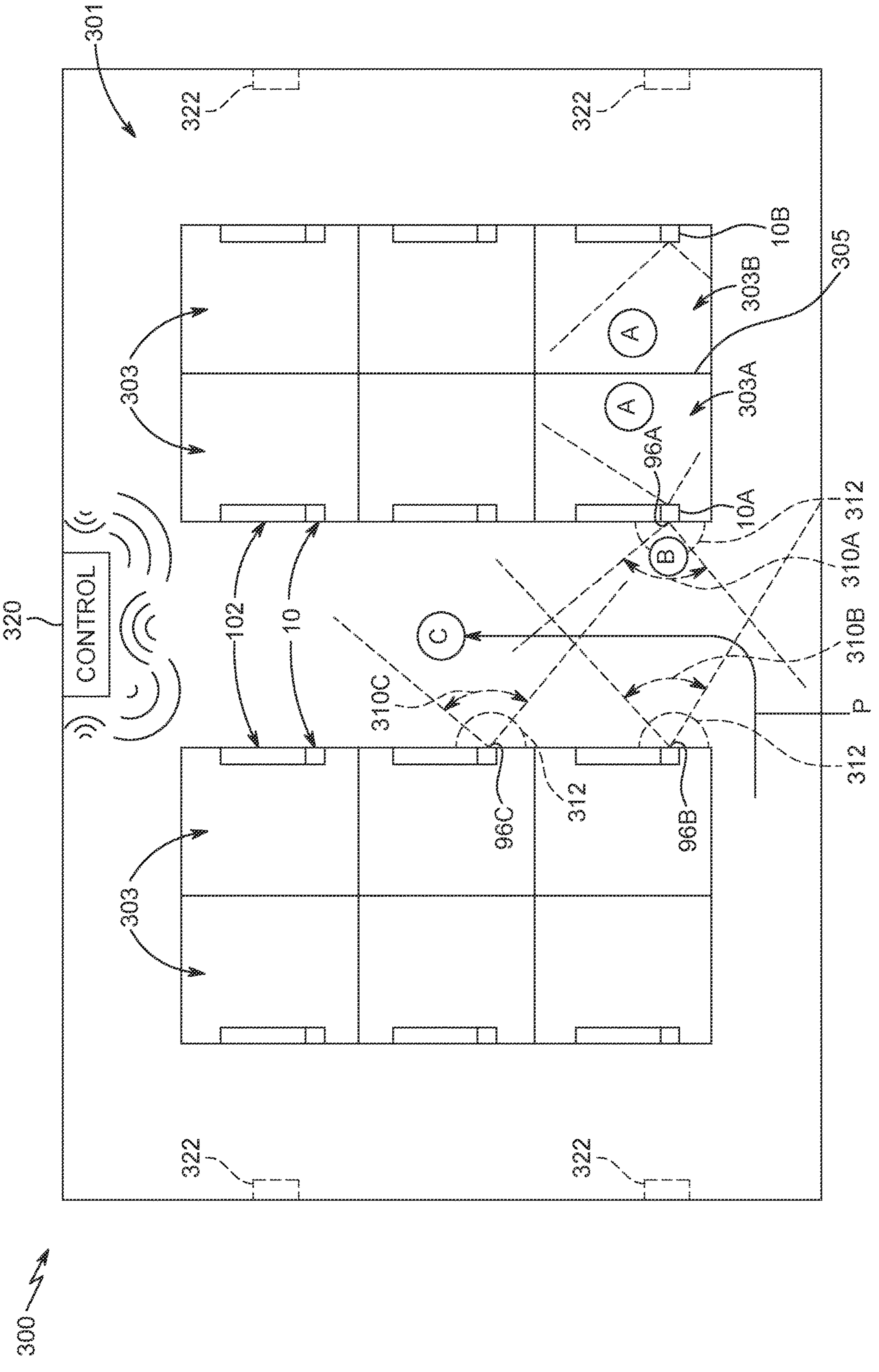
FIG. 7 is a diagrammatic view of a facility and a facility monitoring system including a plurality of door locks with sensors monitoring various areas of the facility.

One or more door locks 10 can be included in a facility monitoring system 300 where the sensors 90, 96 of each door lock 10 monitor for motion activity within a facility 301 as shown in FIG. 7. The facility 301 includes a plurality of individual rooms or units 302. All or some of the units 303 include a door panel 12 and a corresponding door lock 10 coupled to the door panel 12 with each door lock 10 including forward and rearward facing sensors 90, 96. In some embodiments, only one of forward or rearward sensor(s) may be applied in an individual lock. Each sensor 90, 96 can be in communication with a control system 320 included in the facility monitoring system 300.

The control system 320 is configured to send commands and receive signals from each of the sensors 90, 96 separately and/or in unison with one another. The control system 320 includes one or more processors, memory, and communications circuitry for facilitating the disclosed operations. One or more transceivers 322 can be located throughout the facility 301 to relay the commands and signals between the control system 320 and the door locks 10. In this way, the transceivers 322, the control system 320, and the communications circuitry 134 of each door lock 10 communicate over a mesh network throughout the facility 301. In some embodiments, the mesh network includes Wirepas®. The control system 320 is also configured to send alerts or notifications to users in response to the received signals from the sensors 90, 96. In this way, the sensors 90, 96 and the control system 320 inform users of various motion activities occurring in the facility 301. Some Exemplary Situations that the facility monitoring system 300 can monitor are described below.

Exemplary Situation 1

The facility monitoring system 300 may be configured to monitor and provide alerts or notifications for motion of an object A (or person) within one or more of the units 303. For example, the rearward-facing sensor 90 of a first door lock 10A can monitor and provide signals indicative of motion of object A within a unit 303A. If the first door lock 10A is locked and object A motion is sensed, then the control system 320 may output one or more alerts or notifications to user(s) (e.g., the tenant or facility owner) to alert them that unauthorized access to the unit 303A has occurred. The tenant or facility owner may receive the notifications on mobile device 120, a computer, or any other suitable methods for receiving the notification from the control system 320. The notifications may be received in real time or stored in memory included in the control system 320 for retrieval at a later time.

A second unit 303B having a second door lock 10B is located directly next to the first unit 303A. If each door lock 10A, 10B senses motion within a predetermined amount of time (e.g. within 1 minute) the control system 320 may be configured to output a second alert indicative that the object A has migrated between the two units 303A, 303B through a wall 305 bordering each unit 303A, 303B. In this instance, the second alert can be output to each tenant and/or the facility owner to notify them that unauthorized access has occurred in each unit 303A, 303B. The object A may travel through other walls bordering other units 303 thereby causing the rearward-facing sensor 90 of the corresponding door lock 10 to send signals in response to the detected motion of the object A. Thus, the control system 320 is configured to receive all motion signals sensed by each door lock, determine that the object A is traveling between interior walls into units 303, and output one or more alerts indicative of such an event.

Exemplary Situation 2

The facility monitoring system 300 may also be configured to monitor space availability within each of the units 303 and provide notifications based on changes to space availability. For example, the rearward-facing sensor 90 of unit 303A may sense a first volume of objects A within the unit 303 at a first point in time which can be stored in memory in the control system 320 (or in memory storage device 134). At a second point in time later than the first point in time, the rearward-facing sensor 90 may sense a second volume of objects A greater than or less than the first volume. The control system 320 may compare each sensed volume of objects A within the unit 303A and output an alert to the tenant and/or facility owner when a threshold is reached.

In one example, the threshold is available space within the unit 303A. For example, the control system 320 may output a notification when available space within the unit 303A has lowered past a minimum available space (e.g. the unit 303A is full or nearly full). In this instance, the control system 320 may be configured to output a notification to the tenant to inform them that they are nearly out of available space in their unit. The notification may include information on how the tenant can lease another unit within the facility 310 for additional space. The control system 320 can also be configured to output a notification when available space within the unit 303A has risen past a maximum available space (e.g., the unit 303A is empty). In this instance, the notification may be output to the facility owner to inform the facility owner that the tenant has vacated the unit 303A so that they can begin leasing to a new tenant.

Exemplary Situation 3

The facility monitoring system 300 may be configured to monitor and provide alerts or notifications for object motion through one or more hallways or spaces within a field of view 310 of each forward-facing sensor 96 outside of each unit 303. For example, one or more persons B, C may travel through the field of view 310 of multiple forward-facing sensors 96. As the person C moves along a travel path P through succeeding fields of view 310A, 310B, 310C of different forward-facing sensors 96A, 96B, 96C, signals are sent by each sensor and logged in the control system 320 at each point in time that person C comes within view of each sensor 96A, 96B, 96C. Thus, the control system 320 is configured to track the person C traveling within the facility 301 using the forward-facing sensors 96 of each door lock 10. In some embodiments, the control system 320 may store associated movement tracking for retrieval. The control system 320 can continually monitor the position of each person B, C in the facility 301 and monitor when each person enters and leaves the facility 301 using the forward-facing sensor 96 of each door lock 10.

Exemplary Situation 4

The facility monitoring system 300 may be configured to provide tenant services by monitoring tenant B use of one or more door locks 10 and outputting notifications to the tenant B. For example, the forward-facing sensor 96 of each door lock 10 may have a proximity zone 312 and may monitor tenant B presence within the proximity zone 312 (e.g. within a set number of feet). If tenant B remains within proximity zone 312 for a predetermined amount of time without unlocking the door lock 10, the control system 320 is configured to output a notification to the tenant B asking whether the tenant B needs assistance. The tenant B may provide an input back into the control system 320 to request assistance, in which case a further notification may be sent to the facility owner indicative of the input made by tenant B. The control system 320 may also output a notification directly to the facility owner without any input from the tenant B.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

providing a corrugated door panel including at least one groove arranged between at least two ridges along a height of the corrugated door panel, forming a first sensor opening in the corrugated door panel between the first and second ridges, providing a door lock including a latch housing, a movable hasp coupled to the latch housing for sliding movement between a retracted position and an extended position, and a lock mount system configured to attach the door lock to the corrugated door panel, the lock mount system including a number of fasteners, a retainer plate, and a temporary attachment adhesive fixed to a rear surface of the latch housing, forming at least one attachment opening through a first ridge, forming at least one attachment opening through a second ridge arranged spaced apart from the first ridge by the groove, arranging the door lock such that each of the attachment openings of the corrugated door panel align with a complementary opening formed in the latch housing, contacting the temporary attachment adhesive with a front surface of the corrugated door panel so that the door lock adheres in position with the corrugated door panel, inserting a fastener of the number of fasteners through each attachment opening and the complementary opening, and engaging the retainer plate with the corrugated door panel opposite the front surface such that each of the number of fasteners extend through further complementary openings of the retainer plate.

2. The method of claim 1, wherein the retainer plate is formed to include a second sensor opening aligned with the first sensor opening and the motion sensor when the door lock is installed on the corrugated door panel.

3. The method of claim 1, wherein the door lock further includes encoded visual indicia and the method further comprises scanning the encoded visual indicia with an optical camera of a mobile device.

4. The method of claim 3, wherein the encoded visual indicia is configured to generate instructions on the mobile device, the instructions include identifying information for the door lock and the method further includes pairing the door lock with a numbered storage unit to which the corrugated door panel is attached.

5. The method of claim 1, wherein the temporary attachment adhesive is formed as part of a temporary attachment assembly comprising a release layer, and the method further comprises removing the release layer from the temporary attachment assembly.

6. A method comprising:

providing a corrugated door panel including at least one groove arranged between at least two ridges along a height of the corrugated door panel, forming a first sensor opening in the corrugated door panel between the first and second ridges, providing a door lock including a latch housing, a movable hasp coupled with the latch housing for movement between a retracted position and an extended position, and a lock mount system configured to couple the door lock to the corrugated door panel, the lock mount system including a retainer plate, forming at least one attachment opening through the corrugated door panel, arranging the door lock such that the at least one attachment opening of the corrugated door panel aligns with a complementary opening formed in the latch housing, adhering the door lock with a front surface of the corrugated door panel with adhesive composition so that the door lock remains in position with the corrugated door panel, fastening the door lock with the corrugated door panel via a fastener through each of the at least one attachment opening, the complementary opening of the corrugated door panel, and complementary openings of the retainer plate, wherein the retainer plate is arranged on a side of the corrugated door panel opposite the latch housing, wherein the door lock further includes a motion sensor that is arranged to lie at least partially within the latch housing and that is aligned with the first sensor opening when the door lock is fully installed on the corrugated door panel.

7. The method of claim 6, wherein the retainer plate is formed to include a second sensor opening aligned with the first sensor opening and the motion sensor when the door lock is installed on the corrugated door panel.

8. The method of claim 6, wherein the door lock further includes encoded visual indicia and the method further comprises scanning the encoded visual indicia with an optical camera of a mobile device.

9. The method of claim 8, wherein the encoded visual indicia is configured to generate instructions on the mobile device, the instructions include identifying information for the door lock and the method further includes pairing the door lock with a numbered storage unit to which the corrugated door panel is attached.

10. The method of claim 6, wherein the temporary attachment adhesive is formed as part of a temporary attachment assembly comprising a release layer, and the method further comprises removing the release layer from the temporary attachment assembly.

* * * * *